J. B. ENTZ.
STARTING AND LIGHTING SYSTEM.
APPLICATION FILED APR. 20, 1912.
1,239,777.
Patented Sept. 11, 1917.
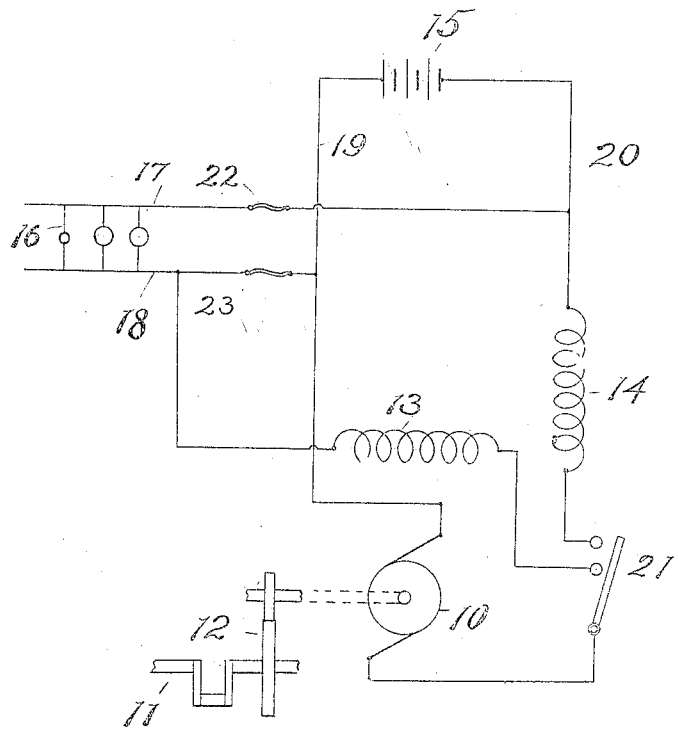

UNITED STATES PATENT OFFICE.

JUSTUS B. ENTZ, OF CLEVELAND, OHIO, ASSIGNOR TO EDWIN L. THURSTON, TRUSTEE, OF CLEVELAND, OHIO.

STARTING AND LIGHTING SYSTEM.

1,239,777.   Specification of Letters Patent.   Patented Sept. 11, 1917.

Application filed April 20, 1912. Serial No. 692,160.

*To all whom it may concern:*

Be it known that I, JUSTUS B. ENTZ, a citizen of the United States, residing at Cleveland, in the county of Cuyahoga and State of Ohio, have invented a certain new and useful Improvement in Starting and Lighting Systems, of which the following is a full, clear, and exact description.

This invention relates to lighting, or starting and lighting systems adapted particularly for engine driven vehicles.

There are in use at the present time on vehicles lighting, or starting and lighting systems having a dynamo electric machine which is intended to be geared or connected to the engine of the vehicle and is provided with differentially wound field windings including a main shunt winding for producing a field of constant polarity and a series winding. When the machine is serving as a generator, the series field opposes the shunt field so as to govern the current output and hence the potential of the generator, and causes the potential to remain substantially constant at varying speeds. If the system is used for starting as well as lighting and battery charging purposes, when the machine is serving as a motor the series field assists the shunt field so as to cause the motor to have strong torque, and in fact, the desirable characteristics of a starting motor.

A starting and lighting system of this type which has been used to some extent, includes a controlling switch having means for disconnecting the shunt field winding when the circuit of the battery and dynamo electric machine is opened by opening the controlling switch. This feature has the important advantage of preventing the voltage of the generator building up and burning out the shunt winding when the machine is being driven by the engine on open circuit or when the voltage and current governing means is inactive.

By the provision of means for disconnecting one side or terminal of the shunt field winding when the controlling switch is opened, there is a liability of burning out the shunt field winding if the generator and battery circuit are always opened at the switch. In case, however, the circuit should be opened at some point other than at the switch, as might be the case if a conductor in some part of the circuit should be broken, or if the circuit should be opened by the breakage or loosening of one of the battery connections, the machine would then be operated by the engine as an open circuit machine, and inasmuch as the switch would then be closed, the shunt winding would be connected to both terminals of the machine, and the voltage might build up and cause the winding to be burned out.

The present invention has for its object the provision of a safety feature in a lighting or starting and lighting system of the general type above briefly explained, said feature being in the form of an automatic cutout which will disconnect the shunt winding from one of the terminals of the machine, in case the battery and generator circuit is accidentally opened at a time when the switch is closed, and the machine is in operation. Further, the invention aims to provide means whereby not only will the shunt field winding be opened, but the lighting circuit will also be opened on the occurrence of the breakage or accidental opening of the generator and battery circuit.

My invention may be briefly summarized as consisting in certain novel combinations and arrangements of parts which will be described in the specification and set forth in the appended claims.

The single figure of the drawing shows diagrammatically a starting and lighting system equipped with my invention.

Referring now to the drawing, 10 represents the armature of the dynamo electric machine which is permanently connected to the crank shaft 11 of the internal combustion engine by a power transmitting agency 12 which for convenience of illustration is shown in the form of a pair of gears. The dynamo electric machine is provided with a shunt field winding 13 for producing a field of constant polarity and a series field winding 14 through which the direction of current is reversed when the machine is changed from a motor to a generator, this field having a magnetizing action when the machine is serving as a motor and demagnetizing action when the machine is serving as a generator. This gives the motor a strong field and good torque for turning over the engine, and inasmuch as the demagnetizing action varies with the speed of the machine when it is serving as a generator, the generator voltage is substantially constant. When the machine is serving as a motor, current is supplied thereto from a storage battery 15, and when the machine is serving as a generator, the latter supplies current to the battery for charging purposes, or to a lamp circuit 16 for lighting purposes, or to both simultaneously. The conductors 17 and 18 of the lamp circuit are connected to conductors 19 and 20 of the battery and generator circuit,—the conductor 17 being here shown as connected to the conductor 20 between one side of the battery and the series winding. The battery and dynamo electric machine connections are controlled by a switch 21 which is arranged between the series winding and the armature. This switch, when opened, opens the armature and battery circuit and disconnects or opens the shunt field winding, and when closed connects in the shunt field winding as well as establishes connection between the armature and battery.

To accomplish the objects above stated, and specifically to cut out the shunt field winding in case the battery and generator circuit is accidentally opened by a breakage of a connection or of a conductor, the shunt field winding is provided in its circuit with an automatic cutout which opens the shunt field circuit when the machine is operated or driven with the circuit between the battery and generator open at any point outside of the shunt field circuit. Preferably, the cutout is in the form of a fuse. I prefer to arrange the fuse or fuses so that the blowing of a fuse will simultaneously open the lamp circuit. I therefore provide in conductors 17 and 18, fuses 22 and 23, and I connect one terminal of the shunt winding to the conductor 18 between the fuse and the lamps, so that the fuse in this conductor 18 is normally in the circuit of the shunt field winding, as well as the lamp circuit.

By this arrangement not only is the circuit of the shunt field winding opened, in case a breakage takes place, but the lamp circuit is opened, and there is eliminated the liability of the batteries being discharged through the lamp circuit in case the break or disconnection occurs at a point or in a manner such as not to open the lamp circuit. If the fuse or fuses were not arranged so as to open the lamp circuit, it would be possible that the operator would not know that the generator was out of service and that the lamps were being supplied with current from the battery instead of the generator. Therefore, by this arrangement of the fuses, I provide double protection against injury to the shunt field winding or damage to the batteries by being completely discharged.

It will be apparent that my invention may be used to advantage in a system wherein the dynamo electric machine is to be used as a generator only, as well as in the system as herein explained, wherein the machine serves both as a starting motor and as a lighting and battery charging generator.

Having thus described my invention, what I claim is:

1. In combination with a prime mover, a dynamo electric machine having a shunt field winding and adapted to be driven by the prime mover, a battery, a switch for connecting the battery and dynamo electric machine into circuit, and means for opening the shunt field circuit when the machine is driven with the circuit between the battery and dynamo electric machine open at any point outside the shunt field circuit.

2. In combination with a prime mover, a dynamo electric machine having a shunt field winding and adapted to be driven by the prime mover, a battery, a switch for connecting the battery and dynamo electric machine into circuit, and means for automatically disconnecting the shunt field winding when the machine is driven with the circuit between the battery and dynamo electric machine open at any point outside the shunt field circuit.

3. In combination with a prime mover, a dynamo electric machine having a shunt field winding and adapted to be driven by the prime mover, a battery, switching means for closing and opening the circuit between the dynamo electric machine and the battery and for connecting and disconnecting the shunt field winding, and means for automatically opening the shunt field circuit, when the dynamo electric machine is being driven by the prime mover, if said circuit between the dynamo electric machine and battery is open at any point outside the shunt field circuit.

4. In combination with a prime mover, a dynamo electric machine having a shunt field winding and adapted to be driven by the prime mover, a battery, a switch for connecting into circuit the battery and dynamo electric machine, a lighting circuit connected to the battery and dynamo electric machine circuit, and means for automatically opening the shunt field circuit and the lighting circuit when the machine is driven with the circuit of the battery and dynamo electric machine open at any point outside the shunt field circuit.

5. In combination with a prime mover, a dynamo electric machine adapted to be driven by the prime mover and provided with a shunt field winding, a battery, a switch for connecting and disconnecting the battery and dynamo electric machine, and means for rendering the shunt winding ineffective for excitation purposes when the machine is driven by the prime mover with its circuit open at any point outside the shunt field circuit.

In testimony whereof, I hereunto affix my signature in the presence of two witnesses.

JUSTUS B. ENTZ.

Witnesses:
 H. R. SULLIVAN,
 A. F. KWIS.